(12) United States Patent
Sugiura et al.

(10) Patent No.: US 7,330,007 B2
(45) Date of Patent: Feb. 12, 2008

(54) OBJECT DETECTING APPARATUS

(75) Inventors: Takehiko Sugiura, Kariya (JP); Masayoshi Takeuchi, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/491,939

(22) Filed: Jul. 25, 2006

(65) Prior Publication Data

US 2007/0022818 A1 Feb. 1, 2007

(30) Foreign Application Priority Data

Jul. 27, 2005 (JP) ............................. 2005-217816

(51) Int. Cl.
*E05F 15/10* (2006.01)
(52) U.S. Cl. ...................... 318/456; 318/469; 318/479; 49/27
(58) Field of Classification Search ................ 318/434, 318/456, 466–470, 479, 488; 49/26, 27
See application file for complete search history.

(56) References Cited

U.S. PATENT DOCUMENTS

| | | | | |
|---|---|---|---|---|
| 4,943,757 A | * | 7/1990 | Richter et al. | .............. 318/468 |
| 5,051,672 A | * | 9/1991 | Yaguchi | ...................... 318/469 |
| 5,396,118 A | * | 3/1995 | Yaguchi | ...................... 327/516 |
| 5,907,213 A | * | 5/1999 | Oshima et al. | ............. 310/328 |
| 6,308,461 B1 | * | 10/2001 | Hopson et al. | ................. 49/28 |
| 6,448,729 B1 | * | 9/2002 | Davies et al. | ............... 318/434 |
| 6,747,399 B1 | * | 6/2004 | Ogino et al. | ................ 310/330 |

FOREIGN PATENT DOCUMENTS

JP 2003-106048 A 4/2003

* cited by examiner

*Primary Examiner*—Bentsu Ro
(74) *Attorney, Agent, or Firm*—Sughrue Mion, PLLC

(57) ABSTRACT

An object detecting apparatus includes a piezoelectric sensor provided at an edge portion of an opening/closing body for emitting an output voltage which changes corresponding to an external force applied to the edge portion and a detection circuit for receiving the output voltage of the piezoelectric sensor and for judging an entrapment. The detection circuit includes a voltage-measuring circuit for measuring the output voltage of the piezoelectric sensor, a time-measuring circuit for measuring time, and a judging circuit configured to judge the entrapment. The judging circuit judges the entrapment corresponding to the output voltage of the piezoelectric sensor. The judging circuit calculates a changing value of the output voltage after the output voltage of the piezoelectric sensor reaches a predetermined first level. The judging circuit judges that the entrapment has not occurred in a situation where the changing value of the output voltage is larger than a predetermined value.

5 Claims, 7 Drawing Sheets

OBJECT DETECTING APPARATUS

CROSS REFERENCE TO RELATED APPLICATIONS

This application is based on and claims priority under 35 U.S.C. §119 to Japanese Patent Application 2005-217816, filed on Jul. 27, 2005, the entire content of which is incorporated herein by reference.

FIELD OF THE INVENTION

This invention generally relates to an object detecting circuit. More specifically, this invention pertains to an object detecting circuit for detecting an entrapment that is the presence of an object sandwiched between a movable body and a fixed body of the an opening/closing apparatus.

BACKGROUND

In an automatic door of a building or an electric slide door apparatus for a vehicle such as a wagon or a van, an electric opening/closing apparatus is provided for sliding a door by a motor or the like to open/close the door. In the electric opening/closing apparatus like this, there is a possibility that an object may be sandwiched between a door frame and the door at the time of a closing operation of the door (an entrapment state). An electric opening/closing apparatus including a control means for detecting an entrapment to stop the closing operation of the door or to reverse the closing operation to the opening operation of the door in such a situation is suggested.

For example, an object detecting sensor, which detects an entrapment with use of a piezoelectric element for detecting acceleration generated by shock or vibrations, is being investigated and is gradually put to practical use. The piezoelectric element generates electric polarization corresponding to external force (stress) such as acceleration. A piezoelectric sensor, in which the piezoelectric element is utilized, outputs oscillating voltage signals, such as a sine wave, by effect of electric polarization generated corresponding to external force induced by an entrapment, or the like, of an object by an opening/closing door, or the like. The sensor outputs voltage signals, not only on the basis of an entrapment, but also on the basis of mechanical vibrations. However, phenomena to be detected (in this case, an entrapment of an object) and other mechanical vibrations can be preferably distinguished because of difference in a frequency of a voltage waveform therebetween. Further, the sensor generates a voltage even when the external force is small, for example, at an initial stage of an entrapment. Accordingly, the sensor can detect an entrapment even at an early stage. Therefore, countermeasure against an entrapment can be taken before force applied to an entrapped object becomes large. JP2003-106048A2 (Patent document 1) describes a technique for using the object detecting sensor, in which the piezoelectric element is utilized, in a hatch back door of an automotive.

An object detecting apparatus described in the Patent document 1 includes, as illustrated in FIG. 17, a piezoelectric sensor 1, a filter 40 for passing a predetermined frequency component of an output signal from the piezoelectric sensor 1, and a judging portion 50 for judging an entrapment on the basis of the output signal from the filter 40. Characteristics of the filter are opted considering vibration characteristics, or the like, of a vehicle body of the automotive. Specifically, the filter is a low-pass filter that extracts signal components equal to or lower than approximately 10 Hz, in order for removing vibrations caused by an engine of the automotive or vibrations caused by running of the automotive. The judging portion 50 is a comparator. If amplitude of the output signal transmitted from the piezoelectric sensor 1 through the filter is equal to or larger than a predetermined value (TH50), the comparator judges that an entrapment has occurred. Reference number 70 in FIG. 17 indicates an operational amplifier for performing impedance conversion, signal amplification, or the like.

As described above, the piezoelectric sensor utilizes piezoelectric effect, in which voltage is generated on the basis of deformation of the piezoelectric element, the deformation induced by vibrations, or the like. Accordingly, the piezoelectric sensor outputs detection signals, not only on the basis of vibrations induced by shock of an entrapment, or the like, but also on the basis of vibrations induced by other phenomena. For example, in a situation where the piezoelectric sensor is provided at a slide door of a vehicle, the piezoelectric sensor outputs detection signals even on the basis of vibrations of the running vehicle, on the basis of vibrations of an engine, or the like. In a waveform illustrated in FIG. 18A, a center part of the waveform has large amplitude. Such a waveform having large amplitude is induced by an entrapment. A right and left part of the waveform has smaller amplitude. Such a waveform having small amplitude is generated by vibrations of the vehicle and by vibrations of the engine. As illustrated in FIG. 18A, frequency of the output of the piezoelectric sensor caused by these mechanical vibrations is high, which is different from a situation where an object is entrapped. Accordingly, the output of the piezoelectric sensor caused by these mechanical vibrations can be preferably removed by the filter 40 (low-pass filter) illustrated in FIG. 17. Further, even if the output of the piezoelectric sensor caused by these mechanical vibrations is not sufficiently attenuated by the filter 40 and a part thereof passes through the filter 40, because amplitude of the part passing through the filter 40 is small, the amplitude does not exceed a judging threshold TH50 in the judging portion 50. Accordingly, the output of the piezoelectric sensor caused by these mechanical vibrations is not wrongly detected as an entrapment.

However, vibrations caused by each phenomenon do not necessarily have clear difference from vibrations caused by other phenomenon. For example, an opening/closing operation of an electric slide door apparatus for a vehicle is not only a simple sliding operation. While the door is being closed, after the slide door slides toward a front direction of the vehicle, the slide door is pulled from the outside of the vehicle to the inside of the vehicle along a bending portion of a door rail (introducing operation). If the slide door of the vehicle slides in a uniform direction, acceleration is not generated. However, in a situation where the slide door starts to slide along the bending portion (introducing operation), a moving direction of the slide door drastically changes. Accordingly, acceleration is generated. When the slide door starts to slide along the bending portion (introducing operation), as illustrated in FIG. 18B, voltage generated by the piezoelectric sensor drastically rises, and after that, the output of the piezoelectric sensor becomes a waveform like a gradual discharge of stored charge. There is a possibility that a discharging time Tb of this discharge becomes close to a half period of time Ta of an output waveform of the sensor in a situation where an entrapment has occurred (illustrated in FIG. 18A). Accordingly, there is a possibility that the output of the piezoelectric sensor passes through the filter 40. Further, because amplitude of the output of the piezoelectric sensor is sufficiently large, there is a possibility that the output of the piezoelectric sensor exceeds the judging threshold TH50 in the judging portion 50, and the output of the piezoelectric sensor is detected as an entrapment. There is a possibility that such a phenomenon occurs, not only on the basis of a change of a sliding direction of the slide door, but also on the basis of external noise.

Further, even in a situation where an entrapment actually occurs, for example, as illustrated in FIG. 18C, there is a possibility that amplitude of the output of the piezoelectric sensor is small according to softness of a material of an entrapped object. A period (2Tc) of the waveform of the output of the piezoelectric sensor is similar to a period (2Ta) of the center part of the waveform illustrated in FIG. 18A. Accordingly, the output of the piezoelectric sensor passes through the filter 40. However, because amplitude of the output of the piezoelectric sensor is small, the amplitude of the output of the piezoelectric sensor does not exceed the judging threshold TH50 in the judging portion 50. Thus, there is a possibility that a correct judgment cannot be made only on the basis of evaluation of frequency and strength (amplitude) of the signal, according to a conventional configuration illustrated in FIG. 17.

For overcoming this, an option would be to employ a method for accurately analyzing a frequency, instead of utilizing the filter 40. However, as described above, frequency of the output voltage of the piezoelectric sensor is very low, precisely, equal to or lower than approximately 10 Hz, in a situation where an entrapment is detected. Accordingly, if the waveform of the output voltage of the piezoelectric sensor is monitored for one cycle for purposes of judgment of the frequency, it takes an inverse number of the frequency, in other words, equal to or longer than 100 milliseconds. By doing so, advantage of utilizing the highly sensitive piezoelectric sensor, by which an initial stage of an entrapment can be detected, cannot be sufficiently exerted.

A need thus exists for an object detecting apparatus, which can preferably detect an entrapment by analyzing an output of a sensor for a short time without mixing up a detection signal generated by a phenomenon different from an entrapment with a detection signal generated by an entrapment. The present invention has been made in view of the above circumstances and provides such an object detecting apparatus.

SUMMARY OF THE INVENTION

According to an aspect of the present invention, an object detecting apparatus includes a piezoelectric sensor provided at an edge portion of an opening/closing body for emitting an output voltage which changes corresponding to an external force applied to the edge portion of the opening/closing body and a detection circuit for receiving the output voltage of the piezoelectric sensor and for judging an entrapment. The detection circuit includes a voltage-measuring circuit for measuring the output voltage of the piezoelectric sensor, a time-measuring circuit for measuring time, and a judging circuit configured to judge the entrapment. The judging circuit judges the entrapment corresponding to the output voltage of the piezoelectric sensor. The judging circuit calculates a changing value of the output voltage after the output voltage of the piezoelectric sensor reaches a predetermined first level. The judging circuit judges that the entrapment has not occurred in a situation where the changing value of the output voltage is larger than a predetermined value.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
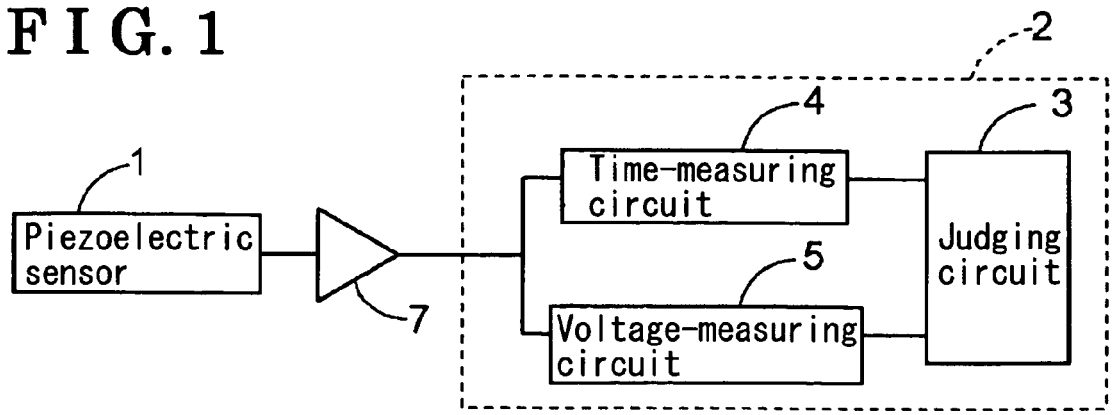
FIG. 1 represents a block diagram schematically illustrating a configuration of an object detecting apparatus.
Figure 2:
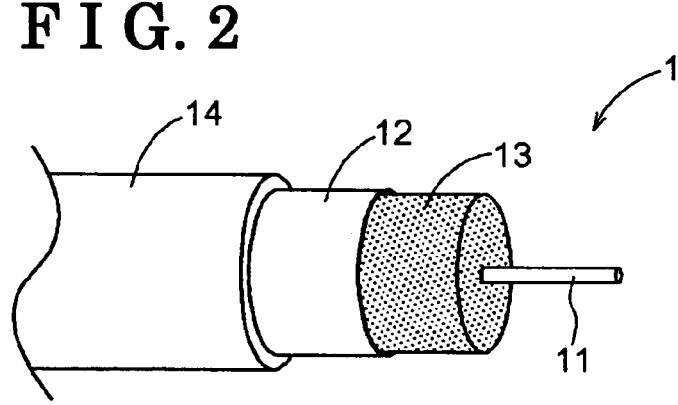
FIG. 2 represents a schematic diagram illustrating an example of a configuration of a piezoelectric sensor illustrated in FIG. 1.
Figure 3:
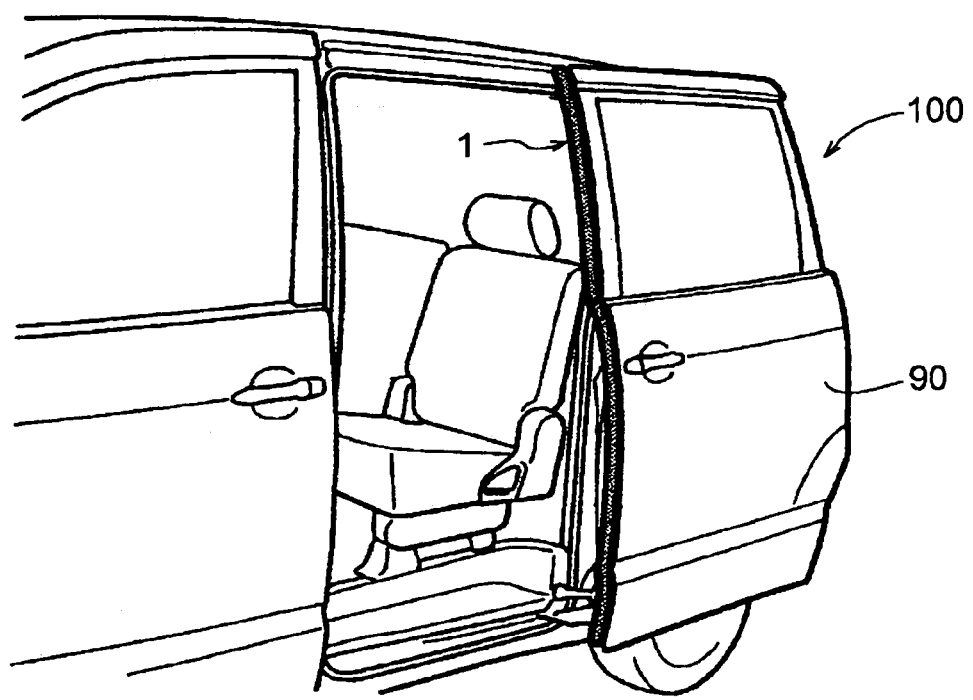
FIG. 3 represents an explanatory diagram illustrating an example in which the piezoelectric sensor illustrated in FIG. 2 is provided at a slide door of a vehicle.

An embodiment of the present invention will be explained with reference to drawing figures. FIG. 1 represents a block diagram typically illustrating a configuration of an object detecting apparatus according to the embodiment of the present invention. FIG. 2 represents a pattern diagram illustrating an example of a configuration of the piezoelectric sensor illustrated in FIG. 1. FIG. 3 represents an explanatory view illustrating an example, in which the piezoelectric sensor illustrated in FIG. 2 is provided at a slide door of a vehicle. The piezoelectric sensor 1 includes a piezoelectric body and two electrodes for sandwiching the piezoelectric body. In a situation where the piezoelectric body is deformed, caused by mechanical external force, such as acceleration, vibrations, or the like, voltage is generated between the electrodes. FIG. 2 illustrates an example of a configuration of the piezoelectric sensor 13, in which the piezoelectric body 13 is sandwiched between a first electrode 11 and a tubular second electrode 12. The first electrode 11 is made by winding a conductor to a wire or a core. Outside of the second electrode 12 is covered by a cover 14. Thus, the piezoelectric sensor 1 is configured to be a coaxial cable. Such a piezoelectric sensor 1 can be preferably provided at an edge portion of a door 90 of a slide door of a vehicle 100, as illustrated in FIG. 3. Here, the slide door of the vehicle 100 serves as an opening/closing apparatus (opening/closing body). The object detecting apparatus according to the embodiment of the present invention detects the presence of the object sandwiched between a movable body (such as the door 90) and a fixed vehicle body of the opening/closing apparatus such as a slide door of a vehicle as illustrated in FIG. 3, on the basis of a frequency component of the output of the piezoelectric sensor 1 and strength of the output signal of the piezoelectric sensor 1.

As illustrated in FIG. 1, the object detecting apparatus according to the embodiment of the present invention includes a detection circuit 2 for receiving the output signal of the piezoelectric sensor 1 for judging an entrapment when a object exists between the door 90 and the fixed vehicle body. The detection circuit includes a voltage-measuring circuit 5 for measuring the output voltage of the piezoelectric sensor 1, a time-measuring circuit 4 for measuring time, and a judging circuit 3 configured to judge an entrapment. The voltage-measuring circuit 5 measures an output voltage of the piezoelectric sensor 1. The time-measuring circuit 4 measures time. The judging circuit 3 calculates a changing value of the output voltage after the output voltage of the piezoelectric sensor reaches a predetermined first level. The judging circuit 3 judges that an object is not entrapped by the slide door in a situation where the changing value of the output voltage is larger than a predetermined value. A reference number 7 indicates an operational amplifier for performing impedance conversion, signal amplification, or the like. Here, the changing value of the output voltage has items of information about a frequency component of the output of the piezoelectric sensor 1 and strength of the output of the piezoelectric sensor 1. Following, the embodiment of the present invention will be explained with specific examples.

Figure 4:
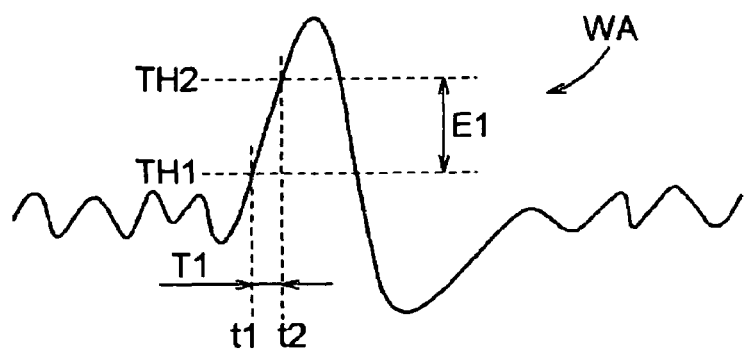
FIG. 4 represents an explanatory view illustrating an example of a standard waveform of an output of the piezoelectric sensor in a situation where an entrapment is detected, and a method for analyzing the waveform according to a first example.
Figure 5:
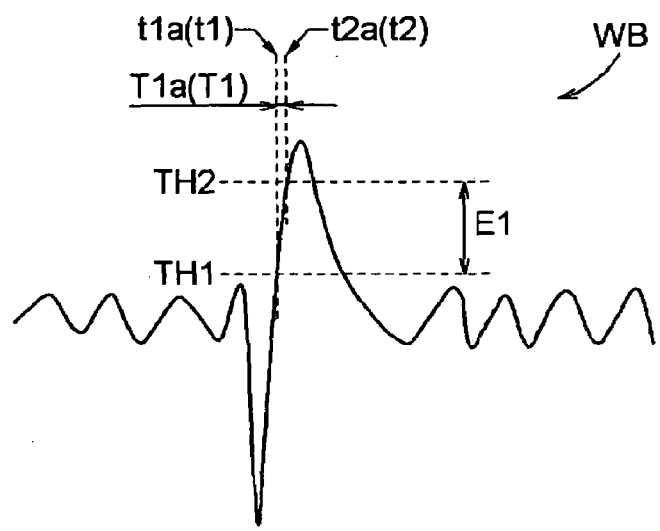
FIG. 5 represents an explanatory diagram illustrating an example of a waveform of the output of the piezoelectric sensor, the waveform generated by a phenomenon other than an entrapment, and a method for analyzing the waveform according to the first example.
Figure 6:
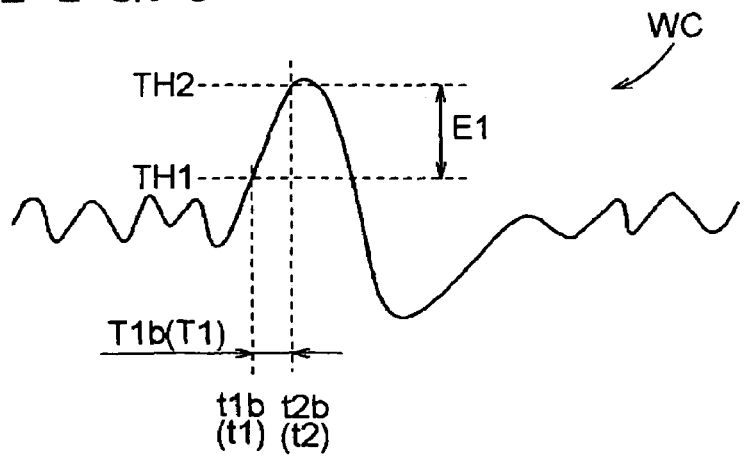
FIG. 6 represents an explanatory view illustrating an example of another waveform of the output of the piezoelectric sensor in a situation where an entrapment is detected, and a method for analyzing the waveform according to the first example.

A first example of the present invention will be explained. With reference to FIGS. 4 to 6, examples of the output waveforms of the piezoelectric sensor 1 and an analyzing method according to the first example for analyzing the waveforms will be explained. FIG. 4 represents a diagram illustrating an example of a standard waveform (WA) of the output of the piezoelectric sensor 1 in a situation where an entrapment is detected. FIG. 6 represents a diagram illustrating another example of a waveform (WB) of the output of the piezoelectric sensor 1 in a situation where an entrapment is detected. FIG. 5 represents a diagram illustrating an example of a waveform (WC) of the output of the piezoelectric sensor. Here, the waveform (WC) is generated by a phenomenon other than an entrapment. From FIGS. 4 to 6, a sign TH1 indicates a predetermined first level of the output voltage of the sensor 1, and a sign TH2 indicates a predetermined second level of the output voltage of the sensor 1. In the first example, the predetermined first level TH1 and the predetermined second level TH2 are respectively common value for each waveform WA, WB, and WC, regardless of a shape of the output waveform of the piezoelectric sensor 1. Accordingly, a voltage difference E1 between the predetermined first level TH1 and the predetermined second level TH2 is also common for each waveform WA, WB, and WC.

While each waveform WA, WB, and WC changes from the amplitude center toward a top portion in an amplitude direction, the output of the sensor 1 changes from the predetermined first level to the predetermined second level. In the first example, the predetermined first level TH1 is set at the amplitude center side (time t1). Similarly, the predetermined second level TH2 is set at the top side from the predetermined first voltage TH1 in the amplitude direction (time t2). The time t1 and the time t2 are different for each waveform WA, WB, and WC. The time-measuring circuit 4 detects the time t1 (t1*a*, t1*b*), at which the output of the piezoelectric sensor 1 is the predetermined first level and the time t2 (t2*a*, t2*b*), at which the output of the piezoelectric sensor 1 is the predetermined second level. The judging circuit 3 calculates a period of time T1 (T1*a*, T1*b*), in which the output voltage of the piezoelectric sensor changes from the predetermined first level to the predetermined second level, from the time t1 and the time t2. The voltage-measuring circuit 5 detects that the output of the piezoelectric sensor 1 becomes the predetermined first level TH1, and that the output of the piezoelectric sensor 1 becomes the predetermined second level TH2, and that a voltage difference between the predetermined first level TH1 and the predetermined second level TH2 is the first voltage difference E1.

The judging circuit 3 determines a gradient of each voltage waveform WA, WB, and WC of the output of the piezoelectric sensor 1 as the changing value of the output voltage. The gradient of each voltage waveform WA, WB, and WC can be obtained by dividing the first voltage difference E1 by the period of time T1. The changing value of the output difference is the gradient of the output of the piezoelectric sensor 1. Accordingly, the changing value of the output difference includes items of information about the frequency component and strength of the output. The period of time T1 of the standard waveform WA is close to the period of time T1*b* of the waveform WC, which is obtained when an entrapment is detected, and which has smaller amplitude than that of the waveform WA. Further, because the first voltage difference E1 is common in the waveforms WA and WC, the gradient thereof as the changing value of the output difference becomes close to each other. On the other hand, the period of time T1 of the waveform WA and the period of time T1*a* of the waveform WB, which is the output of the piezoelectric sensor generated by phenomena other than an entrapment, is largely different. In other words, the gradient (E1/T1a) as the changing value of the output voltage, which is obtained from the waveform WB, is larger than the gradient (E1/T1) as the changing value of the output voltage, which is obtained from the waveform WA.

In a situation where the changing value of the output voltage (gradient) calculated by the judging circuit 3 is larger than a predetermined value (gradient), the judging circuit 3 judges that an object has not been entrapped. The predetermined value is set by calculating the changing value of the output voltage (gradient), which corresponds to phenomena, which are desired to be detected, from a design value, a measured value obtained in experiments, or the like. For example, in a situation where the gradient of the standard waveform WA is set as the predetermined value, the gradient obtained from the waveform WB becomes larger than the predetermined value. As a result, in a situation where the waveform WB is observed, the judging circuit 3 judges that an object has not been entrapped.

Figure 7:
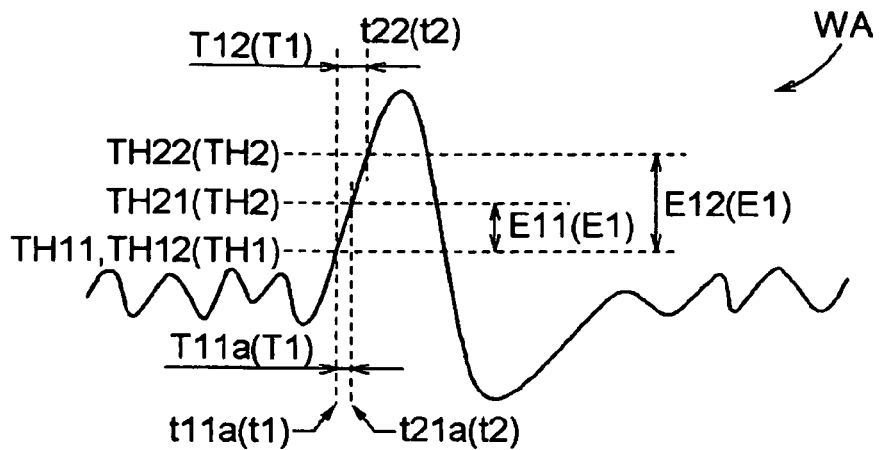
FIG. 7 represents an explanatory diagram illustrating a method for analyzing the example of the waveform illustrated in FIG. 4 according to another example in relation to the first example.
Figure 8:
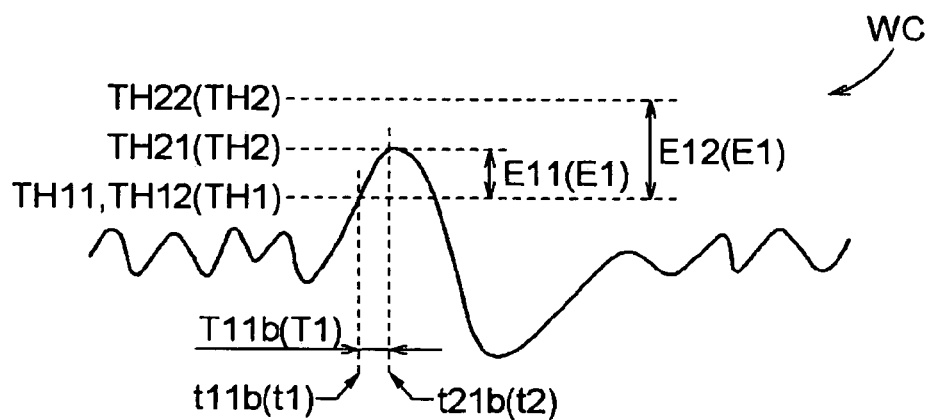
FIG. 8 represents an explanatory diagram illustrating a method for analyzing the example of the waveform illustrated in FIG. 6 according to another example in relation to the first example.

FIGS. 7 and 8 represents an explanatory diagram illustrating a method for analyzing the waveform of the output of the piezoelectric sensor 1 according to another example in relation to the first example of the embodiment. FIG. 7 illustrates an example of the standard waveform (WA) of the output of the piezoelectric sensor 1. The waveform (WA) is obtained in a situation where an entrapment has been detected, as same as FIG. 4. FIG. 8 illustrates an example of another waveform (WC) of the output of the piezoelectric sensor 1. The waveform (WC) is obtained in a situation where an entrapment has been detected, as same as FIG. 6. The output of the piezoelectric sensor 1, the output that is generated by an entrapment, has generally similar frequency. Accordingly, the period of time, from the time when the output of the piezoelectric sensor 1 is near the amplitude center, to the time when the output of the piezoelectric sensor 1 reaches near the top of the amplitude, becomes almost equal for the standard waveform (WA) and the waveform (WC). In the first example described above, the predetermined first level TH1 and the predetermined second level TH2 for detecting the period of time (T1) were commonly set in every occasion (for each waveform). Accordingly, the period of time was not always calculated, from the time when the output of the piezoelectric sensor 1 was near the amplitude center, to the time when the output of the piezoelectric sensor 1 reached near the top of the amplitude, in every waveform. Therefore, in a situation where the output of the piezoelectric sensor 1, the output generated by an entrapment, had different amplitude in some cases, there could be cases where the detected period of time T1 was different, regardless of generally similar frequency. As a result, the obtained changing value of the output voltage (gradient) was different in some cases.

As described above with reference to FIGS. 4 to 6, the period of time T1 of the waveform (WA) was generally close to the period of time T1b of the waveform (WC), of which the amplitude was smaller than that of the waveform (WA). As a result, the gradient of the waveform (WA) and the gradient of the waveform (WC), both as the changing value of the output voltage, were close to each other and had a small difference therebetween. In a situation where more precise judgment is desired, it is preferable that the difference is removed. For doing so, as illustrated in FIGS. 7 and 8, the first voltage differences E1 (output differences) are set. In other words, the judging circuit 3 sets the first voltage differences E1 determined from plural predetermined first levels TH1 and plural predetermined second levels TH2, for example, two first voltage differences E1, which are indicated by a sign E11 and a sign E12. In FIGS. 7 and 8, two predetermined first levels TH1 and two predetermined second levels TH2 are set in order to set two first voltage differences E1. In other words, as the predetermined first levels TH1, voltage values indicated by signs TH11 and TH12 are set. As the predetermined second levels TH2, voltage values indicated by signs TH21 and TH22 are set. In the example described above, the voltage values indicated by the signs TH11 and TH12 are common. Two first voltage differences E11 and E12 can be set from the two predetermined first levels TH1 and the two predetermined second levels TH2. Here, the first voltage difference indicated by the sign E12 is larger than the second voltage difference indicated by the sign E11.

In the waveform WA illustrated in FIG. 7, the first voltage difference E1 indicated by the sign E12, which indicates larger voltage difference, occupies almost half of the amplitude of the waveform WA. In the waveform WC illustrated in FIG. 8, the first voltage difference E1 indicated by the sign E11, which indicates smaller voltage difference, occupies almost half of the amplitude of the waveform WC. As a result, the changing value of the output voltage (gradient), which is calculated for the waveform WA in a situation where the first voltage difference is determined to E12, and the changing value of the output voltage (gradient), which is calculated for the waveform WC in a situation where the first voltage difference is determined to E11, become close. Meanwhile, in the waveform WC, in a situation where the first voltage difference E1 is determined to the sign E12, because the waveform WC does not reach the second predetermined level TH22, the period of time T1, which corresponds to the voltage difference E12, cannot be detected. In a situation of the waveform WA, in which the period of times T12 (from the time t11a to the time t22) and T11a (from the time t11a to the time t21a) are detected, the judging circuit 3 judges on the basis of the changing value of the output voltage calculated from a larger first voltage difference E12 and the period of time T12 detected corresponding to the larger first voltage difference E12. In a situation of the waveform WC, in which only one period of time T11b (from the time t11b to the time t21b) is detected, the judging circuit 3 judges on the basis of the changing value of the output voltage calculated from the detected period of time T11b and the first voltage difference E11 corresponding to the period of time T11b. As described above, in a situation where the judging circuit 3 judges on the basis of at least one of plural changing values of the output voltage, accurate detection can be possible.

Figure 9:
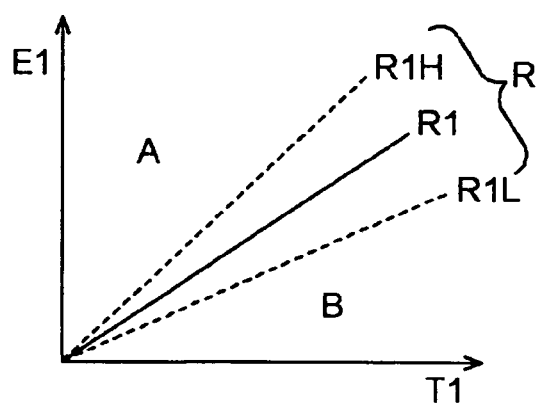
FIG. 9 represents a graph illustrating an example of a predetermined value according to the first example.

FIG. 9 represents a graph illustrating an example of the predetermined value according to the first example. As explained above, the changing value of the output voltage is a function of the period of time T1 and the first voltage difference E1. A solid line R1 indicates an example of such a function of the period of time T1 and the first voltage difference E1 in the graph. Here, for example, the solid line R1 is the predetermined value. In a situation where the changing value of the output voltage is larger than the predetermined value, in other words, in a situation where the changing value of the output voltage, which shifts from the predetermined value toward a side A in the graph illustrated in FIG. 9, is obtained, the judging circuit 3 judges that an object has not been entrapped.

Meanwhile, measurement of change of physical values is generally accompanied by errors. For suppressing such errors, the predetermined value is set to have continuous predetermined values defining a range R, which has a predetermined width. Specifically, as illustrated in FIG. 9, a broken line R1H and a broken line R1L are set at both A and B sides of the solid line R1. Here, the broken line R1H is set as an upper limit of the predetermined value, and the broken line R1L is set as a lower limit of the predetermined value. The range R interposed between the upper limit and the lower limit is set as the range R of the continuous predetermined values. In a situation where the changing value of the output voltage calculated by the judging circuit 3 is detected at the A side out of the range R of the continuous predetermined values, the judging circuit 3 judges that the output of the piezoelectric sensor 1 has not been caused by an entrapment. Further, in a situation where the changing value of the output voltage calculated by the judging circuit 3 falls within the range R of the continuous predetermined values, the judging circuit 3 judges that an object has been entrapped.

Meanwhile, in the explanation described above, the output waveform of the piezoelectric sensor 1 was evaluated on the basis of a higher side of the output from the amplitude center thereof. However, it is not limited. The output waveform of the piezoelectric sensor 1 can be evaluated also on the basis of a lower side of the output from the amplitude center thereof, or also on the basis of both higher and lower sides of the output from the amplitude center thereof. Further, in the explanation described above, a voltage waveform, which can be easily handled in electronic circuits, was taken as an example for simplifying the explanation. However, it is not limited. Also in a situation where the output of the piezoelectric sensor is a current waveform, according to the same technical idea, the gradient of the output current of the piezoelectric sensor can be analyzed on the basis of the output difference between a predetermined first level and a predetermined second level and a period of time in which the output current changes from the predetermined first level to the predetermined second level, and an entrapment can be judged.

Figure 10:
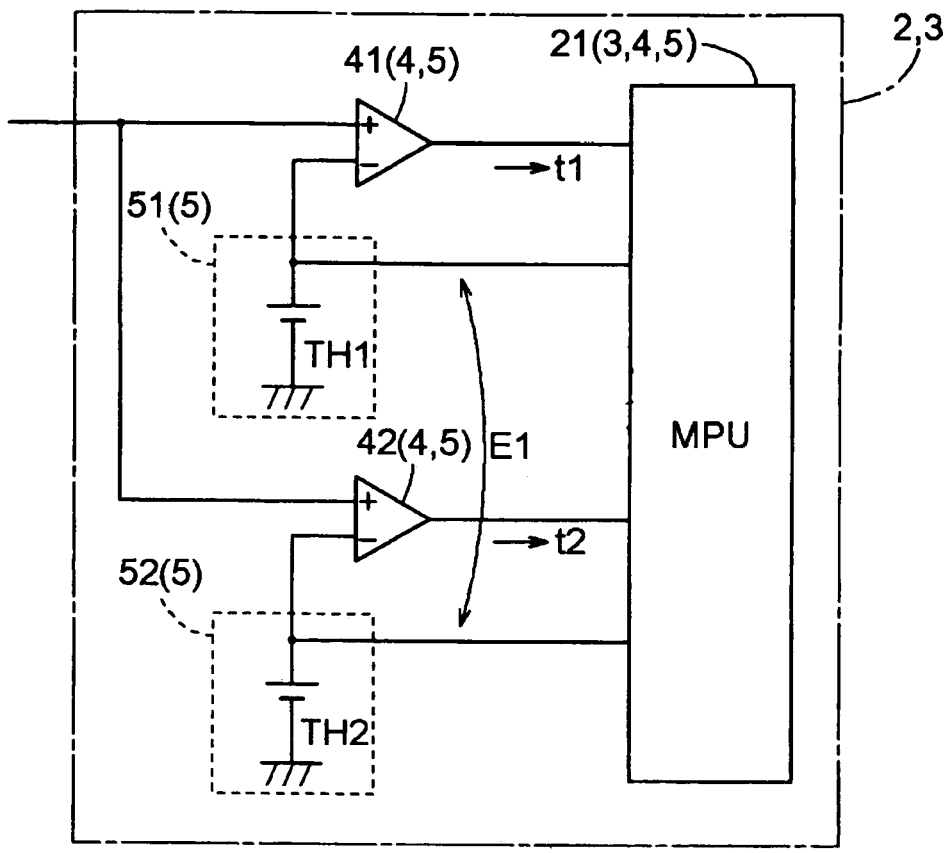
FIG. 10 represents a block diagram schematically illustrating an example of a configuration of the first example.

FIG. 10 represents a block diagram schematically illustrating an example of a specific configuration of the detection circuit 2 according to the first example. In this configuration example, a comparator 41, of which a threshold voltage is the predetermined first level TH1, a comparator 42, of which a threshold voltage is the predetermined second level TH2, and a micro processing unit (MPU) 21, which includes an analog-digital (A/D) converter, are included. The threshold voltages of the comparators 41 and 42 are generated by constant voltage circuits 51 and 52. The comparator 41 transmits items of information to the MPU 21 about the time t1 when the output waveform of the piezoelectric sensor 1 reaches the predetermined first level TH1. The comparator 42 transmits items of information to the MPU 21 about the time t2 when the output waveform of the piezoelectric sensor 1 reaches the predetermined second level TH2. Specifically, signals outputted from the comparators 41 and 42 change at the time t1 and at the time t2. The MPU 21 detects the changing point. Thus, items of information about time can be obtained.

Further, values of the predetermined first level TH1 and the predetermined second level TH2 are determined respectively from the constant voltage circuits 51 and 52 to the MPU 21. The MPU 21 calculates the period of time T1 on the basis of the time t1 and the time t2 transmitted from the comparators 41 and 42. Further, the MPU 21 digitizes the predetermined first level TH1 and the predetermined second level TH2 by the built-in A/D converter, and calculates the first voltage difference E1. Then, the MPU 21 calculates the changing value of the output voltage (gradient) on the basis of the period of time T1 and the first voltage difference E1. Further, the MPU 21 judges whether an object is entrapped by the opening/closing apparatus, on the basis of the changing value of the output voltage and the predetermined value, or on the basis of the changing value of the output voltage and the range R of the continuous predetermined values.

Here, the constant voltage circuits 51 and 52, which determine the predetermined first level TH1 and the predetermined second level TH2, configure the voltage-measuring circuit 5. Because the comparators 41 and 42 detect that the output transmitted from the piezoelectric sensor 1 is the predetermined first level TH1 and that the output transmitted from the piezoelectric sensor 1 is the predetermined second level TH2 respectively, the comparators 41 and 42 configure the voltage-measuring circuit 5. Further, at the same time, the comparators 41 and 42 detect the time when the output of the piezoelectric sensor 1 is the predetermined first level TH1 and the time when the output of the piezoelectric sensor 1 is the predetermined second level TH2. Accordingly, the comparators 41 and 42 configure the time-measuring circuit 4.

Because the MPU 21 calculates the first voltage difference E1 from the predetermined first level TH1 and the predetermined second level TH2 transmitted to the MPU 21, the MPU 21 configures the voltage-measuring circuit 5. Further, because the MPU 21 calculates the period of time T1 from the time t1 and the time t2, the MPU 21 configures the time-measuring circuit 4. Then, because the MPU 21 calculates the changing value of the output voltage from the period of time T1 and the first voltage difference E1, the MPU 21 configures the judging circuit 3. Further, in a situation where the calculated changing value of the output voltage is larger than the predetermined value (range R of the continuous predetermined values), the MPU 21 judges that an object has not been entrapped. In addition, in a situation where the changing value of the output voltage falls within the range R of the continuous predetermined values, the MPU 21 judges that an object has been entrapped. Accordingly, the MPU 21 configures the judging circuit 3.

Thus, there can be a situation where each circuit is not always physically independent in examples. Each circuit indicates an assignment of a function. An object detecting apparatus having these functions can fall within the scope of the present invention. Variations and changes of the object detecting apparatus having these functions can be appropriately made.

As described above, according to the first example, the object detecting apparatus can preferably detect an entrapment by analyzing the output of the sensor for a short period of time without mixing up the detection signal generated by a phenomenon different from an entrapment with a detection signal generated by an entrapment. In other words, in a situation where the changing value of the output voltage is larger than the predetermined value, the judging circuit judges that the changing value of the output voltage has no relation with an entrapment. Accordingly, a detection signal generated by a phenomenon different from an entrapment is not mixed up with a detection signal generated by an entrapment. Further, because the changing value of the output voltage is calculated in the period of time T1, from the time when the output of the sensor is the predetermined first level set at the amplitude center side, to the time when the output of the sensor becomes the predetermined second level set outside from the predetermined first level in the amplitude direction, the output of the sensor can be analyzed for a short period of time. In other words, the output of the sensor can be analyzed for a short period of time, which is approximately a quarter of one cycle at most.

Figure 11:
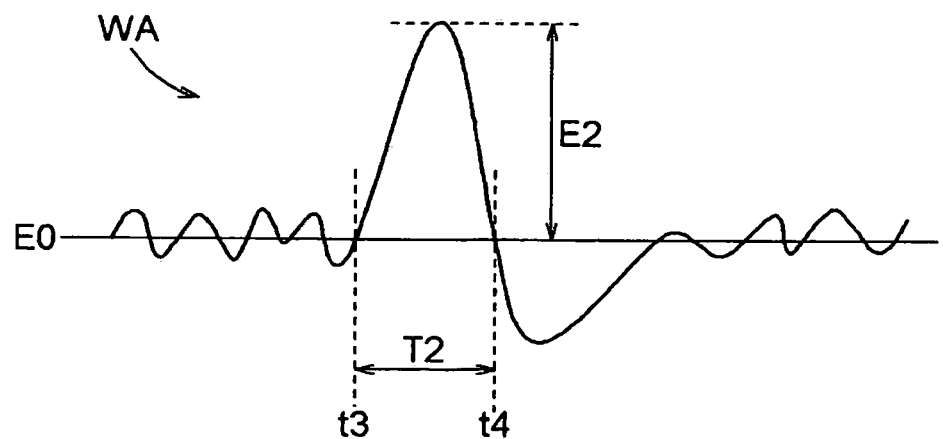
FIG. 11 represents an explanatory diagram illustrating an example of a standard waveform of the output of the piezoelectric sensor in a situation where an entrapment is detected, and a method for analyzing the waveform according to a second example.
Figure 12:
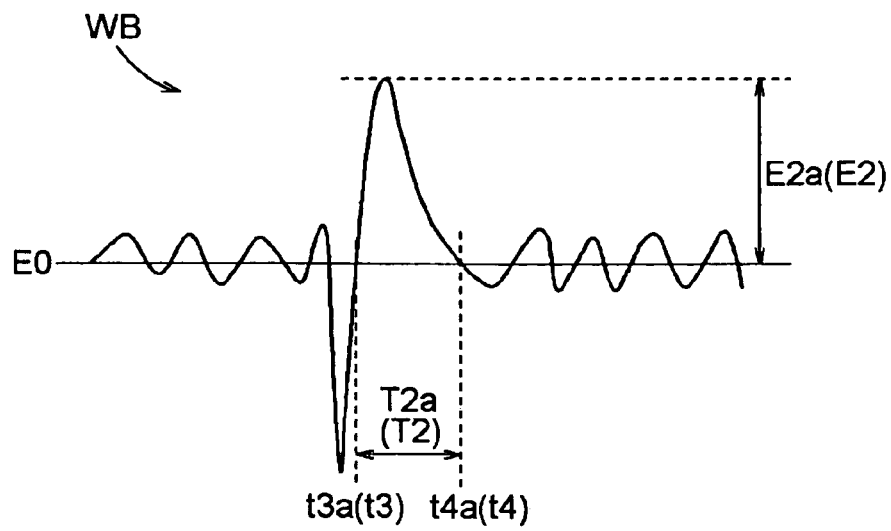
FIG. 12 represents an explanatory diagram illustrating an example of a waveform of the output of the piezoelectric sensor, the waveform generated by a phenomenon other than an entrapment, and a method for analyzing the waveform according to the second example.
Figure 13:
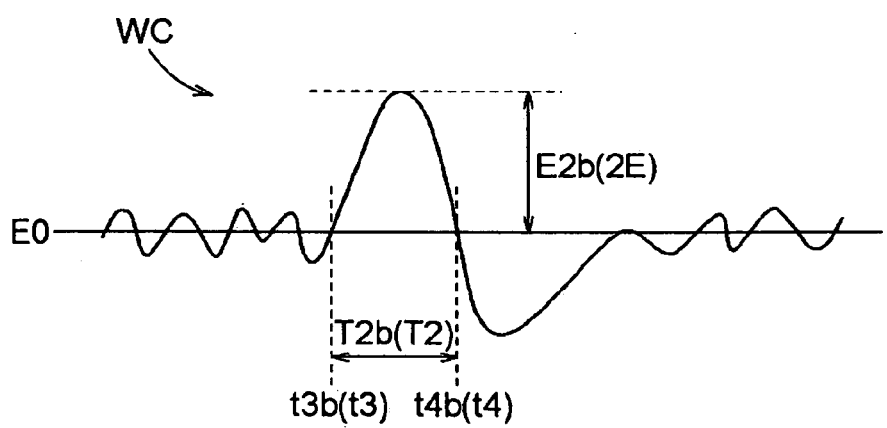
FIG. 13 represents an explanatory diagram illustrating another example of a waveform of the output of the piezoelectric sensor in a situation where an entrapment is detected, and a method for analyzing the waveform according to the second example.

A second example of the present invention will be explained. With reference to FIGS. 11 to 13, examples of the output waveforms of the piezoelectric sensor 1 and an analyzing method according to the second example for analyzing the waveforms will be explained. FIG. 11 represents, similarly to FIG. 4, a diagram illustrating an example of a standard waveform (WA) of the output of the piezoelectric sensor 1 in a situation where an entrapment has been detected. FIG. 12 represents, similarly to FIG. 5, a diagram illustrating an example of a waveform (WB) of the output of the piezoelectric sensor. Here, the waveform (WB) has been generated by a phenomenon other than an entrapment. FIG. 13 represents, similarly to FIG. 6, a diagram illustrating another example of a waveform (WC) of the output of the piezolectric sensor 1 in a situation where an entrapment has been detected. From FIGS. 11 to 13, a sign E2 indicates a second voltage difference corresponding to the output difference.

In each waveform WA, WB, and WC illustrated in FIGS. 11 to 13, a period of time T2 is from the time when each waveform WA, WB, and WC is at a predetermined first level, which is set at an amplitude center E0, to the time when each waveform WA, WB, and WC reaches the predetermined first level again, after each waveform WA, WB, and WC reaches one top portion of the amplitude (maximum amplitude at one side). In other words, the period of time T2 is from the time t3 (t3a, t3b) to the time t4 (t4a, t4b). The period of time T2 is generally equal to a half cycle of the output waveform of the piezoelectric sensor 1. The period of time T2 differs for each waveform. The second voltage difference E2 is an absolute value of a maximum difference in the output of the piezoelectric sensor 1 in the period of time T2, in other words, an absolute value of maximum amplitude in a half cycle of the output waveform of the piezoelectric sensor 1.

The judging circuit 3 determines a changing value of the output difference. Here, the changing value of the output difference is obtained by dividing the second voltage difference E2 by the period of time T2. In other words, the changing value of the output difference is a ratio of the voltage waveform. As described above, a period of time of a half cycle of the output of the sensor can be detected almost accurately. Further, the ratio can be calculated with use of the maximum amplitude in the half cycle of the output of the piezoelectric sensor 1. Accordingly, the changing value of the output difference, which has good accuracy, can be obtained. Further, because the changing value of the output difference is calculated from the period of time of approximately a half cycle of the output of the piezoelectric sensor 1 and the maximum amplitude in this period of time, the changing value of the output difference includes items of information about a frequency component and strength of the output. In the waveform WA illustrated in FIG. 11, the ratio as the changing value of the output difference is (E2/T2). In the waveform WB illustrated in FIG. 12, the ratio as the changing value of the output difference is (E2a/T2a). In the waveform WC illustrated in FIG. 13, the ratio as the changing value of the output difference is (E2b/T2b). As can be clearly seen from FIGS. 11 to 13, E2 is almost equal to E2a, and E2>E2b. Further, T2 is almost equal to T2b, and T2>T2a. Accordingly, the ratio as the changing value of the output difference has a following relation.

$$(E2a/T2a) > (E2/T2) > (E2b/T2b)$$

In a situation where the ratio (changing value of the output difference) calculated by the judging circuit 3 is larger than a predetermined value (ratio), the judging circuit 3 judges that an object has not been entrapped. The predetermined value is set by calculating the changing value of the output difference (ratio), which corresponds to phenomena, which are desired to be detected, from a design value, a measured value obtained in experiments, or the like. Because the waveform WA illustrated in FIG. 11 indicates an example of the standard output of the piezoelectric sensor 1, the ratio (E2/T2) almost corresponds to the predetermined value. Accordingly, the waveform WB, which is illustrated in FIG. 12, and which has a ratio (E2a/T2a) larger than the ratio (E2/T2), is judged not to have been caused by an entrapment of an object, because the waveform WB has a ratio larger than the predetermined value (ratio).

Figure 14:
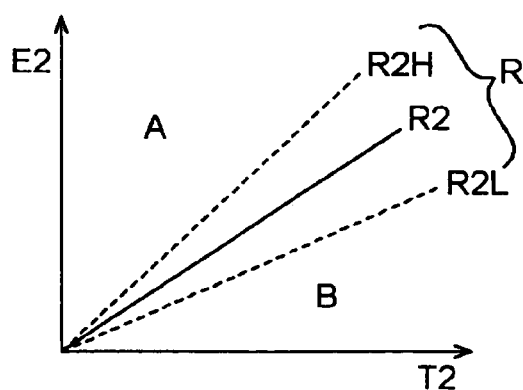
FIG. 14 represents a graph illustrating an example of a predetermined value according to the second example.
Figure 15:
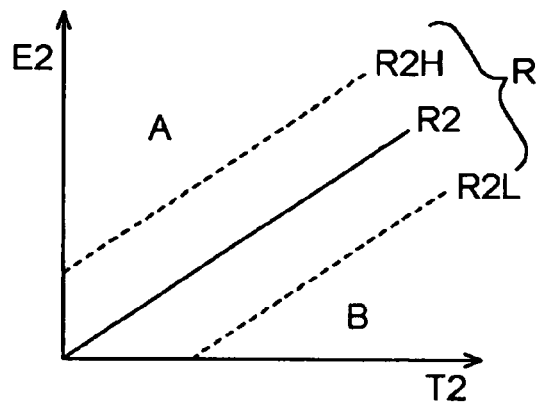
FIG. 15 represents a graph illustrating an another example of the predetermined value according to the second example.

FIGS. 14 and 15 represent graphs illustrating the predetermined value in the second example. The changing value of the output difference is a function of the period of time T2 and the second voltage difference E2. A solid line R2 illustrates an example of such a function of the period of time T2 and the second voltage difference E2 in the graph. Here, for example, the solid line R2 is the predetermined value. In a situation where the changing value of the output difference is larger than the predetermined value, in other words, in a situation where the changing value of the output difference, which shifts from the predetermined value toward a side A in the graph illustrated in FIGS. 14 and 15, is obtained, the judging circuit 3 judges that an object has not been entrapped.

Similarly to the first example, measurement of change of physical values is generally accompanied by errors. For suppressing such errors, the predetermined value is set to have continuous predetermined values defining a range R, which has a predetermined width. Specifically, as illustrated in FIGS. 14 and 15, a broken line R2H and a broken line R2L are set at both A and B sides of the solid line R2. Here, the broken line R2H is set as an upper limit of the predetermined value, and the broken line R2L is set as a lower limit of the predetermined value. The range R interposed between the upper limit and the lower limit is set as the range R of the continuous predetermined values. In a situation where the changing value of the output difference calculated by the judging circuit 3 is detected at the A side out of the range R of the continuous predetermined values, the judging circuit 3 judges that the output of the piezoelectric sensor 1 has not been caused by an entrapment. Further, in a situation where the changing value of the output difference calculated by the judging circuit 3 fills within the range R of the continuous predetermined values, the judging circuit 3 judges that an object has been entrapped.

Meanwhile, in the explanation described above, the output waveform of the piezoelectric sensor 1 was evaluated on the basis of a higher side of the output from the amplitude center thereof. However, it is not limited. The output waveform of the piezoelectric sensor 1 can be evaluated also on the basis of a lower side of the output from the amplitude center thereof, or also on the basis of both higher and lower sides of the output from the amplitude center thereof. Further, in the explanation described above, a voltage waveform, which can be easily handled in electronic circuits, was taken as an example for simplifying the explanation. However, it is not limited. Also in a situation where the output of the piezoelectric sensor is a current waveform, according to the same technical idea, the ratio between the maximum difference in the output current of the piezoelectric sensor in a period of time, from the time when the current waveform is at a predetermined first level (amplitude center), to the time when the current waveform reaches the predetermined first level again after the waveform reaches to one top portion of the amplitude (maximum amplitude at one side), and a length of the period of time, can be analyzed on the basis of the maximum output current difference in the period of time, and the length of the period of time. Then, an entrapment can be judged.

Figure 16:
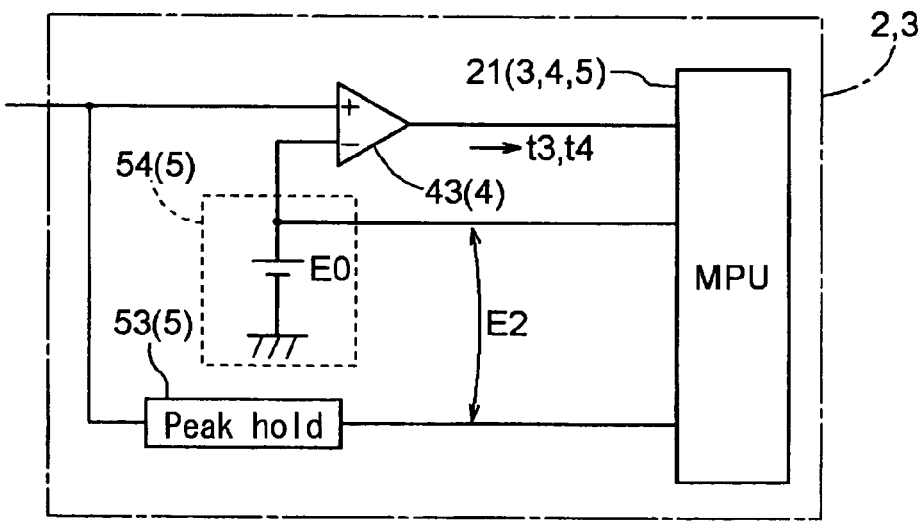
FIG. 16 represents a block diagram schematically illustrating an example of a configuration of the second example.

FIG. 16 represents a block diagram schematically illustrating an example of a configuration of the detection circuit 2 according to the second example. In this configuration example, a comparator 43, of which a threshold voltage is the amplitude center E0, a peak hold circuit 53 for measuring the maximum amplitude of the output of the piezoelectric sensor 1, and a MPU 21, which includes an A/D converter, are included. The amplitude center E0 is determined by a constant voltage circuit 54. The comparator 43 transmits items of information to the MPU 21 about the time t3 when the output waveform of the piezoelectric sensor 1 crosses the amplitude center E0, and about the time t4 when the output waveform of the piezoelectric sensor 1 reaches the amplitude center E0 after the output waveform of the piezoelectric sensor 1 becomes a top of the amplitude. Specifically, a signal outputted from the comparator 43 changes at the time t3 and at the time t4. The MPU 21 detects the changing point. Thus, items of information about time can be obtained.

A maximum voltage value in the amplitude direction is transmitted from the peak hold circuit 53 to the MPU 21. Further, a voltage value of the amplitude center E0 is also transmitted to the MPU 21. The MPU 21 calculates the period of time T2 on the basis of the time t3 and the time t4 transmitted from the comparator 43. Further, the MPU 21 digitizes the amplitude center E0 and the output value of the peak hold circuit by the built-in A/D converter, and calculates the second voltage difference E2. Then, the MPU 21 calculates the changing value of the output voltage (ratio) on the basis of the period of time T2 and the second voltage difference E2. Further, the MPU 21 judges whether an object has been entrapped by the opening/closing apparatus, on the basis of the changing value of the output voltage and the predetermined value, or on the basis of the changing value of the output voltage and the range R of the continuous predetermined values.

Meanwhile, the peak hold circuit 53 cannot measure maximum amplitude in a next cycle if a state of the peak hold circuit 53 that is maintaining a voltage is not reset. Such a reset signal can be given, for example, from the MPU 21 (not illustrated). The MPU 21 has obtained items of information about the time t3 and the time t4. The top of the amplitude to be measured is placed between the time t3 and the time t4. Accordingly, for example, the MPU 21 can obtain the input from the peak hold circuit 53 immediately after the MPU 21 obtains the time t4, and the MPU 21 can reset the peak hold circuit 53 immediately after the MPU 21 obtains the input from the peak hold circuit 53.

Here, the constant voltage circuit 54, which generates a voltage of the amplitude center E0, configures the voltage-measuring circuit 5. Because the peak hold circuit 53 measures the maximum amplitude of the output of the piezoelectric sensor 1, the peak hold circuit 53 configures the voltage-measuring circuit 5. The comparator 43 detects the time t3 when the output transmitted from the piezoelectric sensor 1 becomes larger than the amplitude center E0 and the time t4 when the output transmitted from the piezoelectric sensor 1 becomes lower than the amplitude center E0. Accordingly, the comparator 43 configures the time-measuring circuit 4.

Because the MPU 21 calculates the second voltage difference E2, the MPU 21 configures the voltage-measuring circuit 5. Further, because the MPU 21 calculates the period of time T2 from the time t3 and the time t4, the MPU 21 configures the time-measuring circuit 4. Then, because the MPU 21 calculates the changing value of the output voltage from the period of time T2 and the second voltage difference E2, the MPU 21 configures the judging circuit 3. Further, in a situation where the calculated changing value of the output voltage is larger than the predetermined value (range R of the continuous predetermined values), the MPU 21 judges that an object has not been entrapped. In addition, in a situation where the changing value of the output voltage falls within the range R of the continuous predetermined values, the MPU 21 judges that an object has been entrapped. Accordingly, the MPU 21 configures the judging circuit 3.

Thus, there can be a situation where each circuit is not always physically independent in examples. Each circuit indicates an assignment of a function. An object detecting apparatus having these functions can fall within the scope of the present invention. Variations and changes of the object detecting system having these functions can be appropriately made.

As described above, according to the second example, the object detecting apparatus can preferably detect an entrapment by analyzing the output of the sensor for a short period of time without mixing up the detection signal generated by a phenomenon different from an entrapment with a detection signal generated by an entrapment. In other words, in a situation where the changing value of the output voltage is larger than the predetermined value, the judging circuit judges that the changing value of the output voltage has no relation with an entrapment. Accordingly, a detection signal generated by a phenomenon different from an entrapment is not mixed up with a detection signal generated by an entrapment. Further, the changing value of the output voltage is calculated from a relation between the length of the period of time T2 and the maximum amplitude in the period of time T2, which is approximately half of one cycle. Then, an entrapment is judged on the basis of the changing value of the output voltage. Accordingly, an entrapment can be detected on the basis of a frequency component of the output of the sensor and strength of the output signal of the sensor for a short period of time, which is approximately a half of one cycle.

According to a first aspect of the present invention, an object detecting apparatus includes a piezoelectric sensor provided at an edge portion of an opening/closing body for emitting an output voltage which changes corresponding to an external force applied to the edge portion of the opening/closing body and a detection circuit for receiving the output voltage of the piezoelectric sensor and for judging an entrapment. The detection circuit includes a voltage-measuring circuit for measuring the output voltage of the piezoelectric sensor, a time-measuring circuit for measuring time, and a judging circuit configured to judge the entrapment. The judging circuit judges the entrapment corresponding to the output voltage of the piezoelectric sensor. The judging circuit calculates a changing value of the output voltage after the output voltage of the piezoelectric sensor reaches a predetermined first level. The judging circuit judges that the entrapment has not occurred in a situation where the changing value of the output voltage is larger than a predetermined value.

Figure 18A:
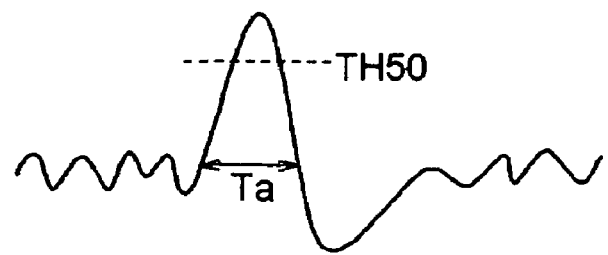
FIGS. 18A, 18B, and 18C represent waveform charts illustrating examples of an output waveform of a piezoelectric sensor.
Figure 18B:
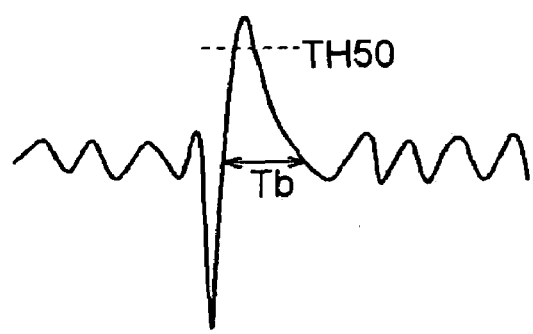
Figure 18C:
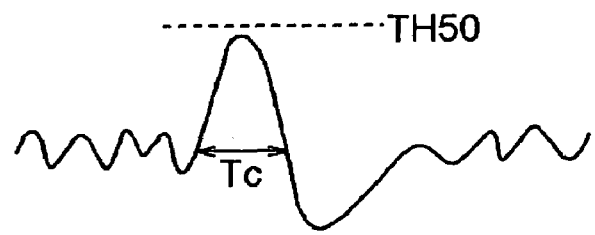

According to the aspect of the present invention, the judging circuit calculates the changing value of the output voltage after the output voltage of the piezoelectric sensor reaches the predetermined first level. Because the changing value of the output voltage includes items of information about a frequency component of the output of the piezoelectric sensor and the strength of the output of the piezoelectric sensor, the judging circuit can judge that an object has not been entrapped by the opening/closing apparatus in a situation where the changing value of the output voltage is larger than the predetermined value. In other words, in a situation where the changing value of the output voltage is too large, some reasons can be assumed. For example, the reasons are: the frequency is too high; the output is too high; and the frequency and the strength of the output are ill-balanced, or the like. Accordingly, the judging circuit can judge, on the basis of the changing value of the output voltage, that an object has not been entrapped. Further, the changing value of the output voltage can be calculated within one cycle of the output voltage of the piezoelectric sensor. Accordingly, the frequency of the output of the piezoelectric sensor and the strength of the output of the piezoelectric sensor can be evaluated for a short period of time, at most shorter than one cycle. Therefore, for example, waveforms similar to a waveform illustrated in FIG. 18B can be preferably eliminated from waveforms which are assumed to be generated by an entrapment. Further, the judging circuit calculates the changing value of the output voltage, not only by simply evaluating the amplitude of the output of the sensor, but also by analyzing the change of the output of the sensor. Accordingly, for example, waveforms like a waveform illustrated in FIG. 18C cannot be improperly eliminated from waveforms which are assumed to be generated by an entrapment. Accordingly, it is possible to detect entrapment accurately.

Figure 17:
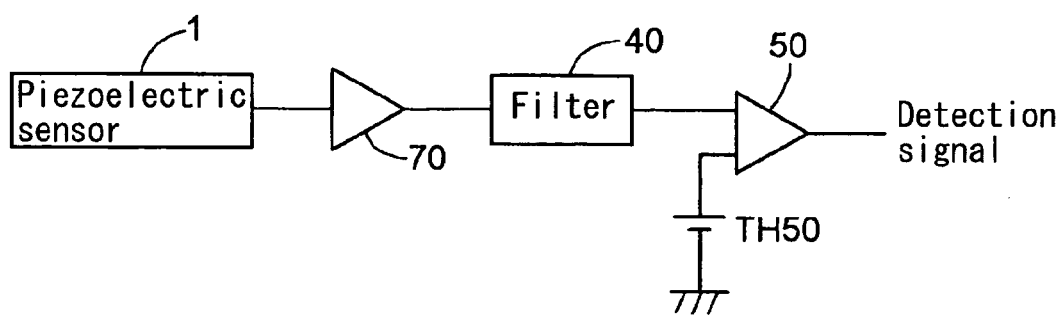
FIG. 17 represents a block diagram schematically illustrating a configuration of a conventional object detecting apparatus.

Further, the object detecting apparatus according to the aspect of the present invention judges an entrapment by quantitatively analyzing the frequency of the output waveform of the sensor and the strength of a signal of the output of the sensor. As illustrated in FIG. 17, an object detecting apparatus of a conventional configuration, including a filter 40, cannot quantitatively detect a frequency. Though filters have effects on a particular frequency band, a boundary of the frequency band is continuous. Accordingly, a clear boundary cannot be drawn in the frequency of the output of the piezoelectric sensor between the frequency of the waveform, which indicates an entrapment, and the frequency of the waveform, which does not indicate an entrapment. On the other hand, in a situation where the frequency is analyzed according to the aspect of the present invention, a clear boundary can be drawn in the frequency of the output of the piezoelectric sensor between the frequency of the waveform, which indicates an entrapment, and the frequency of the waveform which does not indicate an entrapment. Further, in a situation where the filter 40 is not necessary by quantitatively analyzing the frequency of the output waveform of the sensor and the strength of a signal of the output of the sensor according to the aspect of the present invention, a size of a circuit can be smaller. Further, in many cases, the filter 40 includes a condenser. In a situation where the filter 40 is not necessary, the condenser is not necessary either. Accordingly, a period of time, from the time when power of the object detecting apparatus is turned on, to the time when the object detecting apparatus becomes operable, can be shortened. In other words, according to the aspect of the present invention, an object detecting apparatus, which can preferably detect an entrapment by analyzing an output of a sensor for a short period of time without mixing up a detection signal generated by a phenomenon different from an entrapment with a detection signal generated by an entrapment, can be provided.

According to a second aspect of the present invention, the voltage-measuring circuit measures whether the output voltage of the piezoelectric sensor has reached the predetermined first level and a predetermined second level higher than the predetermined first level, the time-measuring circuit measures a period of time from a time when the output voltage of the piezoelectric sensor has reached the predetermined first level to a time when the output voltage of the piezoelectric sensor has reached the predetermined second level, the changing value of the output voltage is a gradient which is obtained by dividing a value obtained by subtracting a voltage of the predetermined first level from a voltage of the predetermined second level by the measured period of time, and the judging circuit judges that the entrapment has not occurred in a situation where the gradient is larger than the predetermined value.

According to the aspect of the present invention, the changing value of the output voltage is calculated, from the time when the output voltage of the piezoelectric sensor reaches the predetermined first level set at the amplitude center side, to the time when the output voltage of the piezoelectric sensor reaches the predetermined second level set at the top portion side from the predetermined first level in the amplitude direction. Accordingly, an output of the sensor can be analyzed for a short period of time, for approximately a quarter of one cycle at most. As a result, the object detecting apparatus can preferably detect an entrapment by analyzing the output of the sensor for a short period of time without mixing up a detection signal generated by a phenomenon different from an entrapment with a detection signal generated by an entrapment. Meanwhile, the change of the output of the piezoelectric sensor, from the amplitude center side to the top portion in the amplitude direction, includes a change toward an upper part of the amplitude center to the top portion and a change toward a lower part of the amplitude center to the top (bottom) portion.

According to a third aspect of the present invention, the time-measuring circuit measures periods of times from the time when the output voltage of the piezoelectric sensor has reached the predetermined first level to times when the output voltage of the piezoelectric sensor has reached respective predetermined plural levels, the changing value of the output voltage includes plural gradients obtained by dividing respective voltages obtained by subtracting the voltage of the predetermined first level from voltages of the predetermined plural levels by the respective period of times, and the judging circuit judges that the entrapment has not occurred when one of the plural gradients is larger than the predetermined value, the one of the plural gradients is calculated by dividing a value obtained by subtracting the voltage of the predetermined first level from the voltage of the largest one of the plural levels by the period of time from the time when the output voltage of the piezoelectric sensor has reached the predetermined first level to the time when the output voltage of the piezoelectric sensor has reached the largest one of the plural levels.

According to the aspect of the present invention, in a situation where plural levels are set, a gradient of each output having different amplitude can be calculated under a condition corresponding to each output. In other words, a variance of the calculated gradient can be small, and accuracy of the judgment on the basis of the gradient can be high. As a result, the object detecting apparatus can detect an entrapment with high accuracy without mixing up a detection signal generated by a phenomenon different from an entrapment with a detection signal generated by an entrapment.

According to a fourth aspect of the present invention, the voltage-measuring circuit measures a maximum value of the output voltage in a predetermined period of time from the time when the output voltage of the piezoelectric sensor has reached the predetermined first level the changing value of the output voltage is a ratio obtained by dividing the maximum value of the output voltage by the measured predetermined period of time, and the judging circuit judges that the entrapment has not occurred when the ratio is larger than the predetermined value.

According to the aspect of the present invention, the judging circuit calculates the changing value of the output voltage, from the time when the output of the piezoelectric sensor is the amplitude center, to the time when the output of the piezoelectric sensor reaches the amplitude center again after the output of the piezoelectric sensor reaches one top portion of the amplitude (maximum amplitude of one side). Because of an almost accurate period of time, which is a half cycle of the output of the sensor, can be detected, detection accuracy of the frequency can be high. Further, because the ratio is calculated by dividing the maximum value of the output voltage by the measured predetermined period of time, in other words, the ratio is calculated from the maximum amplitude in the half cycle, the changing value of the output voltage can be calculated with high accuracy. Further, the output of the sensor can be analyzed for a short time, approximately a half of one cycle. Accordingly, the output of the sensor can be analyzed with accuracy for a short period of time. As a result, the object detecting apparatus can preferably detect an entrapment by analyzing an output of a sensor for a short period of time without mixing up a detection signal generated by a phenomenon different from an entrapment with a detection signal generated by an entrapment.

According to a fifth aspect of the present invention, the predetermined value includes continuous predetermined values defining a range, and the judging circuit judges that the entrapment has not occurred when the changing value of the output voltage is out of the range.

According to the aspect of the present invention, in a situation where the frequency is quantitatively analyzed, a clear boundary can be drawn in the frequency of the output of the piezoelectric sensor between the frequency of the waveform, which indicates an entrapment, and the frequency of the waveform, which does not indicates an entrapment. However, measurement of change of physical values is generally accompanied by errors. For suppressing influence from such errors, a buffer region can be provided to some extent. In other words, as described above, the predetermined value is set as the range of the continuous predetermined values, which has the predetermined width. As a result, an object detecting apparatus, which can preferably detect an entrapment without mixing up a detection signal generated by a phenomenon different from an entrapment with a detection signal generated by an entrapment, can be provided.

The principles, preferred embodiment and mode of operation of the present invention have been described in the foregoing specification. However, the invention that is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. An object detecting apparatus, comprising:
a piezoelectric sensor provided at an edge portion of an opening/closing body for emitting an output voltage which changes corresponding to an external force applied to the edge portion of the opening/closing body;
a detection circuit for receiving the output voltage of the piezoelectric sensor and for judging a presence of an object;
the detection circuit comprising: a voltage-measuring circuit for measuring the output voltage of the piezoelectric sensor; a time-measuring circuit for measuring time; and a judging circuit configured to judge the presence of the object;
the judging circuit judging the presence of the object corresponding to the output voltage of the piezoelectric sensor;
the judging circuit calculating a changing value of the output voltage after the output voltage of the piezoelectric sensor reaches a predetermined first level; and
the judging circuit judging that the presence of the object has not occurred in a situation where the changing value of the output voltage is larger than a predetermined value.

2. The object detecting apparatus according to claim 1, wherein the voltage-measuring circuit measures whether the output voltage of the piezoelectric sensor has reached the predetermined first level and a predetermined second level higher than the predetermined first level, the time-measuring circuit measures a period of time from a time when the output voltage of the piezoelectric sensor has reached the predetermined first level to a time when the output voltage of the piezoelectric sensor has reached the predetermined second level, the changing value of the output voltage is a gradient which is obtained by dividing a value obtained by subtracting a voltage of the predetermined first level from a voltage of the predetermined second level by the measured period of time, and the judging circuit judges that the presence of the object has not occurred in a situation where the gradient is larger than the predetermined value.

3. The object detecting apparatus according to claim 2, wherein the time-measuring circuit measures periods of times from the time when the output voltage of the piezoelectric sensor has reached the predetermined first level to times when the output voltage of the piezoelectric sensor has reached respective predetermined plural levels, the changing value of the output voltage includes plural gradients obtained by dividing respective voltages obtained by subtracting the voltage of the predetermined first level from voltages of the predetermined plural levels by the respective period of times, and the judging circuit judges that the presence of the object has not occurred when one of the plural gradients is larger than the predetermined value, the one of the plural gradients is calculated by dividing a value obtained by subtracting the voltage of the predetermined first level from the voltage of the largest one of the plural levels by the period of time from the time when the output voltage of the piezoelectric sensor has reached the predetermined first level to the time when the output voltage of the piezoelectric sensor has reached the largest one of the plural levels.

4. The object detecting apparatus according to claim 1, wherein the voltage-measuring circuit measures a maximum value of the output voltage in a predetermined period of time from the time when the output voltage of the piezoelectric sensor has reached the predetermined first level, the changing value of the output voltage is a ratio obtained by dividing the maximum value of the output voltage by the measured predetermined period of time, and the judging circuit judges that the presence of the object has not occurred when the ratio is larger than the predetermined value.

5. The object detecting apparatus according to claim 1, wherein the predetermined value includes continuous predetermined values defining a range, and the judging circuit judges that the presence of the object has not occurred when the changing value of the output voltage is out of the range.

* * * * *